Aug. 5, 1930.                G. W. VOLZ                1,772,121
                    VALVE MOTION FOR DUPLEX PUMPS
                    Filed March 7, 1928        3 Sheets-Sheet 2
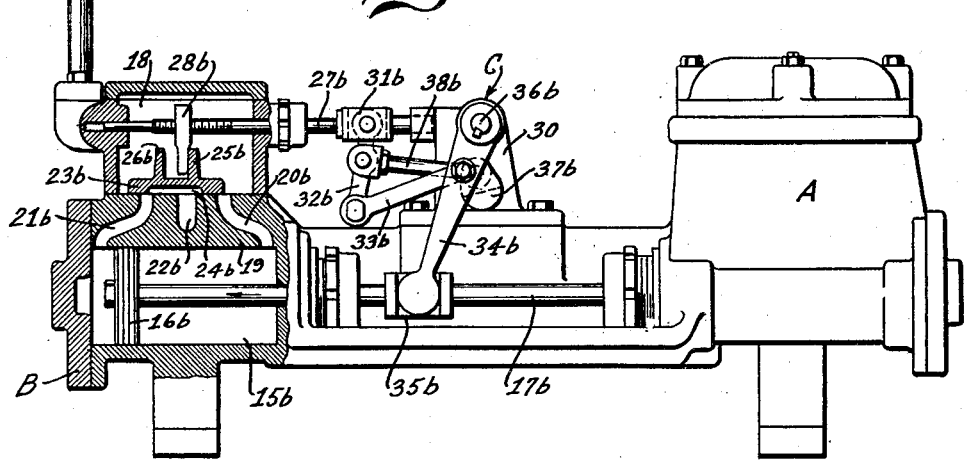
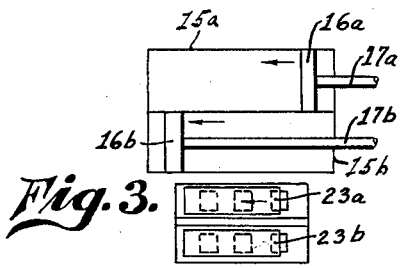
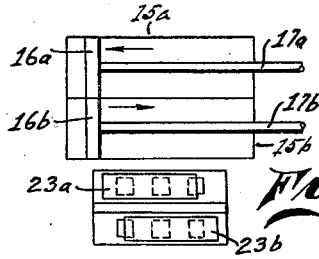
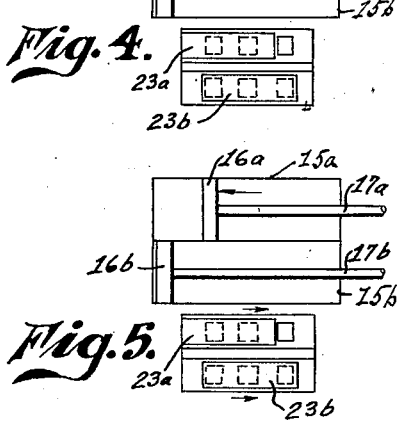
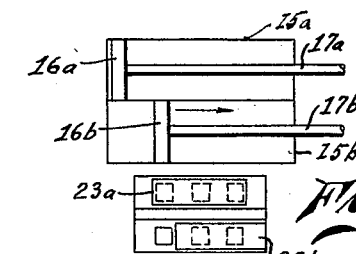
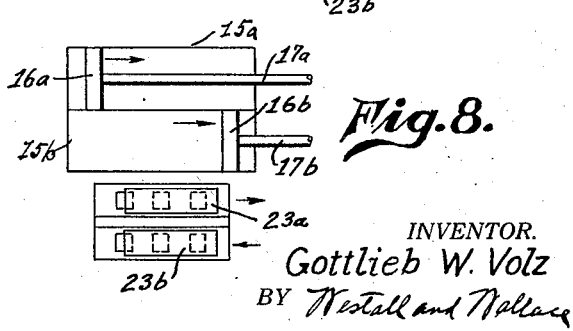
INVENTOR.
Gottlieb W. Volz
BY Westall and Wallace
ATTORNEYS.

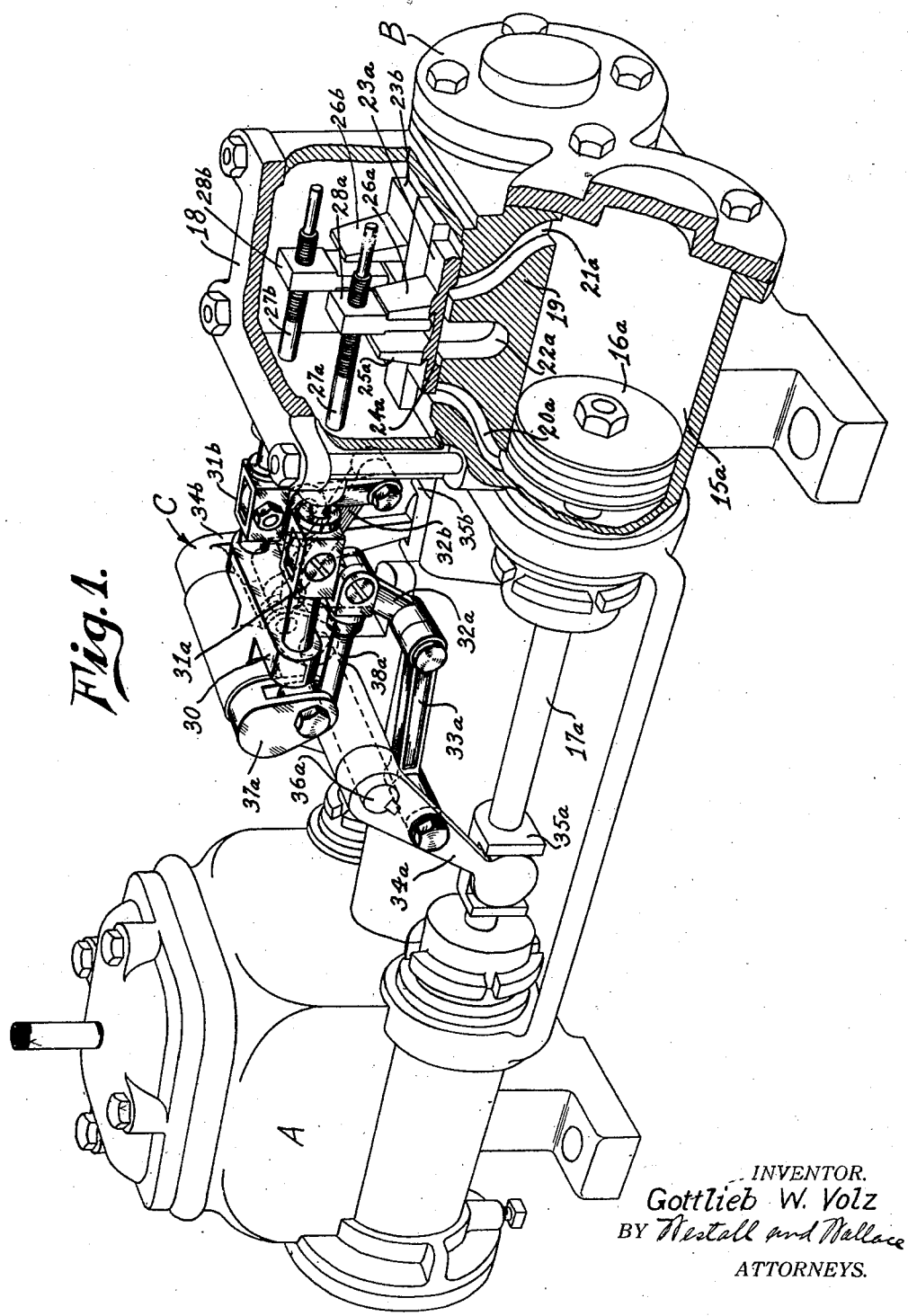

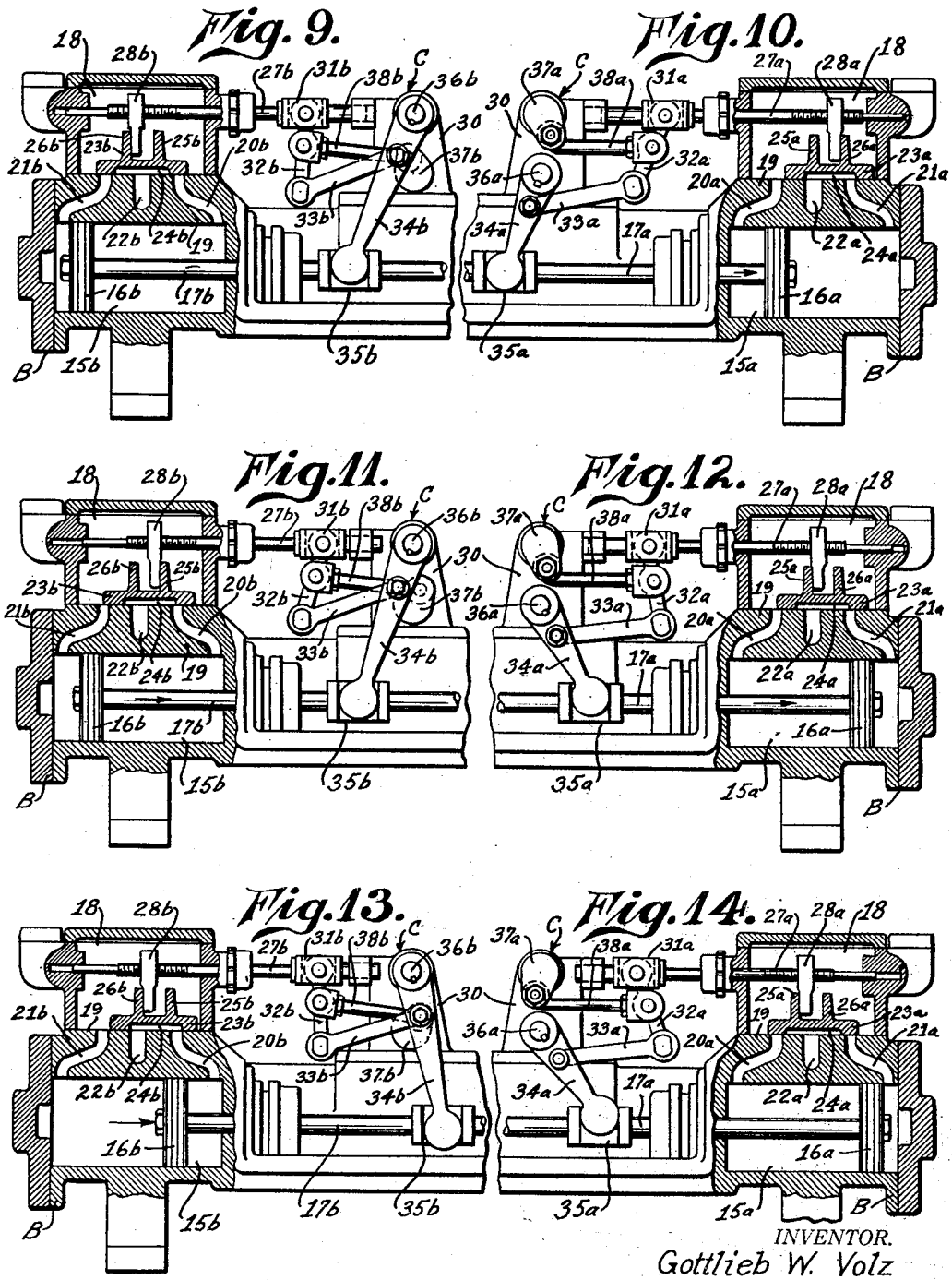

Patented Aug. 5, 1930

1,772,121

UNITED STATES PATENT OFFICE

GOTTLIEB W. VOLZ, OF LONG BEACH, CALIFORNIA, ASSIGNOR TO VOLZ ENGINEERING CORPORATION, OF LONG BEACH, CALIFORNIA, A CORPORATION OF CALIFORNIA

VALVE MOTION FOR DUPLEX PUMPS

Application filed March 7, 1928. Serial No. 259,673.

This invention relates to a duplex steam pump which delivers a non-pulsating flow of liquid, and pertains particularly to a valve motion for causing functioning of the pump in such manner.

In the standard types of duplex pumps, there is a pulsating delivery of liquid due to alternation of the working strokes of the pump members and one pump member decreasing in speed at the ends of its stroke and the other member picking up the load, the latter starting from the zero speed and increasing to full speed then decreasing in speed. As is well known, pulsation causes racking of the pipes and fittings and pounding of the valves on their seats, resulting in leaky valves. Furthermore, inertia of the column of liquid must be overcome. This results in a waste of steam. Air chambers have been currently installed in the delivery line to overcome pulsation, but these do not remedy pulsation in the pump itself.

The present invention has for its primary object the provision of a duplex pump which delivers a continuous flow of liquid without any substantial pulsation. This is accomplished by causing the pump pistons to overlap in their travel at the ends and beginning of their strokes so as to be displacing the same total amount of liquid at all times. To cause functioning in this manner, when both pistons are moving in overlapping position, the sum of the speeds should be equal to that of a single piston moving at full speed. A more specific object of this invention is to provide a valve motion which will cause functioning of the pump in the manner above mentioned. A further object of this invention is to provide a valve motion wherein each valve is moved by the action of both pistons. A still further object of this invention is to provide a valve motion of the character described wherein the opposite piston produces most of the valve travel so as to maintain step.

These objects together with other objects and corresponding accomplishments are obtained by means of the embodiment of my invention illustrated in the accompanying drawing in which:—

Fig. 1 is a perspective view of a complete pump with portions of the steam chest and steam cylinders broken away to better illustrate the invention; Fig 2. is a side elevation of the pump showing the steam end in section; Figs. 3 to 8 inclusive are diagrammatic views of the steam valves and associated steam cylinders in various travel positions, and Figs. 9 to 14 are elevations of the steam ends partly in section showing positions of steam pistons, steam valves, and the valve motion at different travel positions. In Figs. 9 to 14, the contiguous members of the steam end are shown opposed for better illustration of the action. Thus, Figs. 9 and 10 show a pair in corresponding positions in their travel. Likewise Figs. 11 and 12 show the same pair in another position, and Figs. 13 and 14 show them in still another position.

Referring more particularly to Figs. 1 and 2, the pump end A may be of any well known double acting type comprising two pumps side by side with suitable plungers and valves. The specific construction is not pertinent to the present invention, the steam end B comprising two steam cylinders with pistons and valves. The valve motion is indicated generally by C. Referring more specifically to the steam end, the parts are similar for each member and are marked with the same reference numerals, but with alphabetical indices appended, "a" for one member and "b" for the other. The steam cylinders are shown in a single block.

The steam cylinder $15^a$ has reciprocably mounted therein a piston $16^a$ with a piston rod $17^a$ secured thereto. This rod is connected to the corresponding pump plunger. There is a common steam chest 18 having a valve seat 19. In the seat are steam inlet ports $20^a$ and $21^a$. Between the steam ports is an exhaust port $22^a$. Riding on the valve seat is a slide valve $23^a$ of the D type having an exhaust cavity $24^a$. Upstanding from the valve are spaced tappet abutments $25^a$ and $26^a$. A valve rod $27^a$ has a tappet $28^a$ disposed between the tappet abutments so as to provide a lost motion connection. The valve rod is slidably supported at its end in a socket in bracket 30.

A box $31^a$ having a slot therein is secured to valve rod 27ª. Pivotally mounted in the slot is a floating lever 32ª. The lower end of the lever is connected by a link 33ª to a rocker arm 34ª pivotally mounted in the bracket at the upper end, the lower end being received in a slide box 35ª attached to a piston rod 17ª. The rocker arc 34ª is fixed to a shaft 36ª to which an upwardly extending crank arm 37ᵇ is connected forming a bell crank lever. Valve rod 27ᵇ has a box 31ᵇ in which is pivoted a floating lever 32ᵇ. The lower end of lever 32ᵇ is connected by a link 33ᵇ to rocker arm 34ᵇ. It will be noted that while rocker arms 34ª and 34ᵇ are corresponding elements, one is longer than the other because of the necessities of compact assembly of parts. Rocker arm 34ᵇ is attached to a shaft 36ᵇ journalled in bracket 30. Attached to the other end is a depending crank arm 37ª forming a bell crank lever. Crank arm 37ª is connected by a link 38ª to floating lever 32ª intermediate its ends. Crank arm 37ᵇ will oscillate at its upper end in the opposite direction to the rocker arm 34ª. Crank arm 37ᵇ is connected by a link 38ᵇ to the floating lever 32ᵇ intermediate its ends. It will be noted that each valve rod is connected by linkage to both piston rods so that its movement is effected by the two pistons.

Referring to Figs. 1 and 2, piston 16ᵇ is shown moving outwardly and has approached near the end of its stroke. Valve 23ᵇ is near its outer position, half uncovering steam port 20ᵇ. Tappet 28ᵇ is engaged with the inner tappet abutment on valve 23ᵇ and moving inwardly. Movement of piston 16ᵇ outwardly causes rocker arm 34ᵇ to be swung outwardly. Motion is transmitted from the rocker arm to floating lever 32ᵇ moving the lower end outwardly. Piston 16ª has started its movement outwardly. Valve 23ª is near its outer position, half uncovering port 20ª. Half of the steam at full port opening of a single port is entering cylinders 15ª and 15ᵇ. This results in half speed of each piston and its pump plunger and the total or cumulative displacement per unit of time is equal to the displacement at full port opening of one piston, which is hereinafter termed normal displacement. Movement of piston 16ª outwardly causes rocker arm 34ª to be swung outwardly and with it crank arm 37ᵇ in an inward direction. This causes a movement of the intermediate part of floating lever 32ᵇ inwardly. Rocker arm 34ᵇ is being swung outwardly by reason of the outward movement of piston 16ᵇ and acts upon the lower end of the lever 32ᵇ to move it outwardly. The differential movement causes the top of the floating lever and valve rod 27ᵇ to be moved inwardly toward closing position of steam port 20ᵇ. Rocker arm 34ª being swung outwardly causes the lower end of floating lever 32ª to be swung outwardly. Rocker arm 34ᵇ being swung outwardly causes crank arm 37ª to be swung outwardly. The composite motion causes valve 23ª to be moved outwardly. Fig. 3 shows diagrammatically the positions of the pistons and valves and the appended arrows their directions of motion. Valve 23ª is continued in its movement toward full opening of port 20ª. While valve 23ᵇ is continued in its movement toward closing position of port 20ᵇ. Closing of one port is compensated by opening of the other, keeping the total opening equal to normal or full port opening. As piston 16ᵇ slows down, piston 16ª speeds up so that the total flow from the pumps is kept normal. Eventually the pistons and valves reach the positions shown in Figs. 9 and 10.

Referring to Figs. 9 and 10, piston 16ᵇ has reached the end of its stroke, valve 23ᵇ covering both its steam ports. Valve 23ª has moved to full opening of port 20ª, and the pump is delivering the normal amount of liquid. The valve rod tappet 28ᵇ is at the outer end of its travel engaging the outer tappet abutment. The valve rod 27ᵇ can now be moved inwardly a limited distance without causing movement of the valve 23ᵇ. In the position shown in Fig. 9, the piston rod 17ᵇ is at rest so that the lower end of rocker arm 34ᵇ in box 35ᵇ is stationary and link 33ᵇ is likewise stationary. Movement is then only obtained through link 38ᵇ which is actuated from piston 16ª. Referring to Fig. 10, piston 16ª and its valve 23ª, it will be noted that the piston has been moved about one-quarter of its outer stroke. Steam port 20ª is fully uncovered. On the outer travel of piston 16ª, and piston rod 17ª rocker arm 34ª is swung outwardly transmitting motion to crank arm 37ᵇ and lever 32ᵇ inwardly, with the result that valve rod 27ᵇ will be started on its inner travel. However, valve rod 27ᵇ must be moved until tappet 28ᵇ engages the inner tappet abutment before the valve 23ᵇ is started on its inward travel. There is therefore an interval during which valve 23ᵇ remains in position closing its steam ports and valve 23ª with its ports 20ª full open. Arm 34ᵇ being stationary, crank arm 37ª is likewise stationary causing link 38ª to hold lever 32ª stationary at its center. Movement of lever 32ª is effected through rocker arm 34ª and link 33ª to cause valve rod 27ª to be moved inwardly. Tappet 28ª travels from the outer tappet abutment to the inner before causing valve 23 to be moved toward position to cover steam port 20ª and piston 16ª will during that time be caused to travel to a point about three-quarters of its stroke. In the position shown in Figs. 9 and 10, valve port 20ª is fully uncovered and piston 16ª is traveling at full speed and its pump is delivering the full amount of water while piston 16ᵇ is stationary and its pump delivering no water so that normal flow is continued. In Fig. 4 the position of the valves and pistons corresponding to Fig. 9 and 10 is shown diagrammatically.

A next succeeding position of the parts is illustrated diagrammatically in Fig. 5. It will be noted that due to the lost motion between the tappets and valves, the piston 16ª has moved inward to a position about three-quarters of its stroke and piston 16ᵇ remains stationary at the outer end of its stroke, without either valve 23ª or 23ᵇ being moved.

The next succeeding position is shown in Figs. 11 and 12 and diagrammatically in Fig. 6. The tappet 28ᵇ has engaged the inner tappet abutment on valve 23ᵇ and moved the latter so as to half uncover port 21ᵇ, admitting steam behind piston 16ᵇ and starting it on its inward travel. This causes swinging of rocker arm 34ᵇ inwardly and acts to swing the lower end of floating lever 32ᵇ. Rocker arm 34ª is being swung outwardly causing crank arm 37ᵇ to be swung inwardly moving valve 23ᵇ toward opening position of port 21ᵇ. Referring to its companion, rocker arm 34ª is being moved outwardly tending to swing lever 32ª and valve rod 27ª inwardly. However, movement of rocker arm 34ᵇ transmits motion through crank arm 37ª, hastening the movement of the valve rod 27ª and valve 23ª inwardly toward a position covering steam port 20ª. The position is illustrated diagrammaticaly in Fig. 6. Both ports 20ª and 21ᵇ are half uncovered admitting steam to their respective cylinders in half the fully uncovered amount and causing the pistons to travel at half speed. Both pumps are delivering one-half the amount of liquid that they would normally. Their total is therefore the full normal amount. The next succeeding position of the pistons is shown in Fig. 7. Piston 16ª has completed its outer stroke and piston 16ᵇ about one quarter of its inward stroke. The valve 23ª has been moved to steam port closing position and valve 23ᵇ to full steam port open position. The ports are in opposite position to that shown in Figs. 9 and 10. Valve 23ª is stationary in full closed position. Valve 23ᵇ is at the end of its inner travel. Valve rods 27ª and 27ᵇ are now started back and due to their lost motion, the valves remain stationary for an interval. Piston 16ª remains stationary and 16ᵇ continues the remainder of its three-quarter stroke. However, valve 23ª is continued on its inward travel, while valve 23ᵇ is stationary and thereafter started on its inward travel to the position shown in Figs. 13 and 14.

The next position illustrated in Fig. 8 shows the valves traveling in opposite direction, the ports 21ª and 21ᵇ each half open and the pistons both traveling inwardly. The piston 17ᵇ has about completed its stroke and piston 17ª is just starting. The pistons and valves are at the opposite ends of their travel to that shown in Fig. 3, and the movements will be accomplished in the reverse direction in correspondence with those already described.

It will be noted that the sum of the total port areas open at any one time is always substantially equal to one port fully opened; furthermore, that when one piston is at the end of its stroke, the other is traveling at full speed; and still further, that when one piston is decreasing in speed, the other is increasing so that the total displacement speed is always the same. The lost motion connection between the valve rods and tappets permits one valve to remain fully open for an interval and during that interval the other valve to remain fully closed.

It will be further noted that at no time are both pistons stationary, one always travelling at full port opening while the other is stationary and one piston starting its return stroke before the other reaches the end of its stroke. There is thus an overlapping of the working travel of the pistons at both ends of their strokes thereby maintaining a continuous flow of water without any substantial pulsation.

What I claim is:—

1. In a duplex pump having reciprocating plunger mechanism, a duplex reciprocating motor for reciprocating said plunger mechanism including valves for each motor member; control mechanism for said motor actuated from said motor mechanism including a lever for operating each valve, each lever being connected at one end to a valve to operate the latter, being connected at the other end to one of the members of said plunger mechanism to produce a component of oscillatory movement and being connected intermediate said ends to the other member of said plunger mechanism to produce a component of oscillatory movement, said plunger mechanism thereby producing composite motions whereby to alternately cause normal displacement of the plungers at intermediate portions of their strokes and overlapping of their strokes at the ends to effect cumulative normal displacement of said plungers.

2. In a duplex pump having reciprocating plunger mechanism, a duplex reciprocating fluid actuated motor for reciprocating said plunger mechanism, slide valves for said motor, valve stems; and a valve motion actuated by said plunger mechanism and controlling said valves including a lever for operating each valve, each lever being connected at one end to a valve stem to operate the latter, being connected at the other end to one of the members of said plunger mechanism to produce a component of oscillatory movement and being connected intermediate said ends to the other member of said plunger mechanism to produce a component of oscillatory movement, said plunger mechanism thereby producing composite motions whereby alternately to fully admit actuating fluid to one member of the motor at an intermediate portion of its stroke and to maintain the other member of the motor stationary, and to admit actuating fluid to both members at the ends of their strokes in a cumulative amount substantially equal to full admission to one member.

3. In a duplex pump having reciprocating plungers, a duplex reciprocating fluid actuated motor having piston rods, one connected to each plunger, slide valves for said motor controlling inlet ports thereto; a valve motion including linkage, one for each valve, each linkage including a lever for operating each valve, each lever being connected at one end to a valve to operate the latter, being connected at the other end to one of said piston rods to produce a component of oscillatory movement and being connected intermediate said ends to the other of said rods to produce a component of oscillatory movement, said piston rods thereby producing a composite motion whereby to operate said valves so as to fully open an inlet port to one of the members of said motor at the intermediate portion of its stroke and maintain the inlet port of the other member closed, and to open inlet ports to both members at the ends of their strokes in a cumulative amount substantially equal to full port opening.

In witness that I claim the foregoing I have hereunto subscribed my name this 24th day of February, 1928.

GOTTLIEB W. VOLZ.